US008792884B2

(12) United States Patent
Lim

(10) Patent No.: US 8,792,884 B2
(45) Date of Patent: Jul. 29, 2014

(54) HOME PLMN SEARCH METHOD OF MOBILE TERMINAL

(75) Inventor: Sung-Won Lim, Gumi-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 12/909,249

(22) Filed: Oct. 21, 2010

(65) Prior Publication Data

US 2011/0098039 A1    Apr. 28, 2011

(30) Foreign Application Priority Data

Oct. 22, 2009   (KR) ........................ 10-2009-0100783

(51) Int. Cl.
*H04B 15/00*   (2006.01)
*H04W 4/00*   (2009.01)

(52) U.S. Cl.
USPC ......... 455/433; 455/525; 455/435.2; 370/328

(58) Field of Classification Search
USPC ........... 455/552.1, 433–435.3, 558, 525, 524, 455/517, 440; 370/328, 329
See application file for complete search history.

(56) References Cited

U.S. PATENT DOCUMENTS

| 7,274,933 | B2* | 9/2007 | Zinn et al. ................... 455/435.2 |
| 7,818,024 | B2* | 10/2010 | Gunaratnam et al. ......... 455/525 |
| 7,962,136 | B2* | 6/2011 | Bocking et al. ............ 455/432.1 |
| 2004/0263489 | A1* | 12/2004 | Wallenius ..................... 345/173 |
| 2005/0059397 | A1* | 3/2005 | Zhao .......................... 455/435.2 |
| 2005/0113088 | A1* | 5/2005 | Zinn et al. ................... 455/435.2 |
| 2008/0146280 | A1* | 6/2008 | Sasse et al. ................... 455/558 |
| 2009/0185524 | A1* | 7/2009 | Sammour et al. ............ 370/328 |
| 2010/0227641 | A1* | 9/2010 | Muller ....................... 455/552.1 |
| 2011/0053574 | A1* | 3/2011 | Rice ............................. 455/418 |

* cited by examiner

*Primary Examiner* — Nizar Sivji
(74) *Attorney, Agent, or Firm* — Jefferson IP Law, LLP

(57) ABSTRACT

A Home Public Land Mobile Network (Home PLMN) search method of a mobile terminal is disclosed. The method includes determining whether an input continued for a preset period of time from a user is generated on a specified item located in a predetermined area of an idle screen, comparing a PLMN service area in which the mobile terminal is located with a Home PLMN of the mobile terminal when the input is generated as a result of the determination, and searching for the Home PLMN when the PLMN service area is not identical to the Home PLMN, and registering the searched Home PLMN so as to match the searched Home PLMN with an input of the specified item, and initializing a timer set for a Home PLMN search.

9 Claims, 2 Drawing Sheets

HOME PLMN SEARCH METHOD OF MOBILE TERMINAL

PRIORITY

This application claims the benefit under 35 U.S.C. §119(a) of a Korean patent application filed in the Korean Industrial Property Office on Oct. 22, 2009, and assigned Ser. No. 10-2009-0100783, the entire disclosure of which is hereby incorporated by reference.

BACKGROUND OF THE INVENTION

1. Field of the Invention

The present invention relates to a roaming service using a mobile terminal. More particularly, the present invention relates to a Home Public Land Mobile Network (PLMN) search method of a mobile terminal for rapidly performing a location registration in a Home PLMN or preferred roaming network by a touch on a touch screen of the mobile terminal when frequent movement through border areas sharing borders occurs.

2. Description of the Related Art

With the rapid globalization of the mobile industry, roaming contracts are made between providers of many countries. Accordingly, the user can receive a service that enables the user to use his/her own terminal with a Universal Subscriber Identity Module (USIM) or Subscriber Identity Module (SIM), without any change, even when the user has moved into another country. Such a service is called a "roaming service." The roaming service enables a subscriber to use a mobile communication service in an authorized network only if the subscriber has a legal International Mobile Subscriber Identity (IMSI).

A communication terminal receiving such a roaming service stores information on a Home Public Land Mobile Network (PLMN) to which the corresponding subscriber has joined and information on a last registered PLMN in which the communication terminal has been last used in a USIM or SIM. When the communication terminal is powered on, the communication terminal acquires a system information message using a frequency of a maximum reception strength, extracts PLMN information from the system information message, and compares the extracted PLMN information with the last registered PLMN information. When the extracted PLMN information is not identical to the last registered PLMN information, the communication terminal recognizes that the current state is a state in which international roaming is required, and performs a location registration procedure for a base station of an adjacent cell using the extracted PLMN information, so that the communication terminal receives an international roaming service.

However, upon performing the roaming service between European countries sharing borders, whenever a communication terminal enters a Home PLMN or a mobile communication network roaming-agreed with the Home PLMN, it is necessary to ensure a period of time to search for the Home PLMN information and last registered PLMN information. As a result, frequent movement through border areas increases roaming charges.

In addition, when the user attempts to forcibly change a location registration through a menu in order to reduce the roaming charges, the user must click many times in order to execute a corresponding function due to a large number of entries in the menu. Therefore, the procedure of allowing the user to directly change a location registration using a menu also has a problem in that unnecessary time consumption occurs.

SUMMARY OF THE INVENTION

As aspect of the present invention is to address at least the above-mentioned problems and/or disadvantages and to provide at least the advantages described below. Accordingly, an aspect of the present invention provides a method for rapidly performing a location registration only by one touch on a Public Land Mobile Network (PLMN) search item displayed in an idle screen of a mobile terminal having a touch screen by displaying the PLMN search item in the idle screen, checking if a touch input by the user is applied to the PLMN search item, comparing PLMN information of an area in which the mobile terminal is located with Home PLMN information when the touch input is applied, and performing a location registration in the Home PLMN or preferred roaming network.

In accordance with an aspect of the present invention, a Home PLMN search method of a mobile terminal is provided. The method includes determining whether an input continued for a preset period of time from a user is generated on a specified item located in a predetermined area of an idle screen, comparing a PLMN service area in which the mobile terminal is located with a Home PLMN of the mobile terminal when the input is generated as a result of the determination, and searching for the Home PLMN when the PLMN service area is not identical to the Home PLMN, and registering the searched Home PLMN so as to match the searched Home PLMN with an input of the specified item, and initializing a timer set for a Home PLMN search.

In accordance with another aspect of the present invention, a method of searching for a Home PLMN is provided. The method includes, when receiving a predetermined input signal from a user, determining whether a current PLMN in which the user's mobile terminal is operating is identical to a Home PLMN of the user's mobile terminal; when the current PLMN is not identical to the Home PLMN, searching for the Home PLMN; and when the Home PLMN is found, registering the found Home PLMN and modifying a user interface displayed on the user's mobile terminal such that a user interface item corresponding to the predetermined input signal is associated with the Home PLMN.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiment of the present invention will be more apparent from the following description taken in conjunction with the accompanying drawings, in which.

DETAILED DESCRIPTION OF EXEMPLARY EMBODIMENT

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A mobile terminal explained in the following description corresponds to a complex terminal receiving a communication service through a wired/wireless public network, but exemplary embodiments of the present invention are not limited thereto. The mobile terminal according to an exemplary embodiment of the present invention may be a mobile communication terminal, and may be any information communication device or multimedia device, such as a digital broadcasting terminal, a Personal Digital Assistant (PDA), a smart phone, a 3G terminal, and the like, or may be an application thereof. The 3G terminal includes, for example, an International Mobile Telecommunication 2000 (IMT-2000) terminal, a Wideband Code Division Multiple Access (WCDMA) terminal, a Global System for Mobile communication/General Packet Radio Service (GSM/GPRS) terminal, and a Universal Mobile Telecommunication Service (UMTS) terminal.

The mobile terminal described below may include a USIM or SIM module, can perform a voice/image communication and/or data communication with a counterpart through a communication network, and may transmit an international roaming request signal to a switching system through the communication network when international roaming is requested; and the communication network functions to ensure the mobility of the mobile terminal, includes a base station and a base station controller, and supports both synchronous and asynchronous communications.

Figure 1:
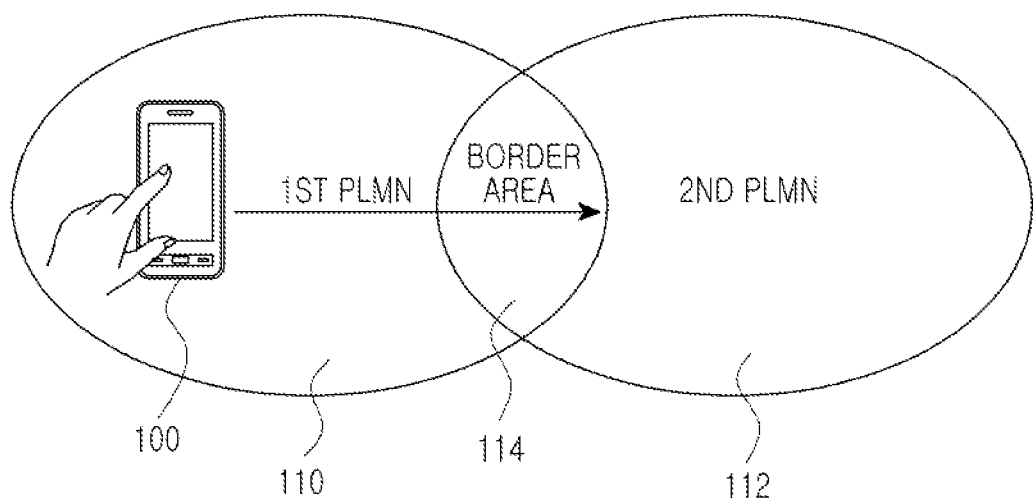
FIG. 1 is a view showing a case where a mobile terminal, to which a Home Public Land Mobile Network (Home PLMN) search method of the mobile terminal according to an exemplary embodiment of the present invention is applied, moves into a border area.

FIG. 1 shows a case where a mobile terminal, to which the Home Public Land Mobile Network (Home PLMN) search method of the mobile terminal according to an embodiment of the present invention is applied, moves into a border area.

Referring to FIG. 1, a first PLMN service area 110 and a second PLMN service area 120 have an overlapping border area 114. When the mobile terminal 100 moves into the border area 114, a roaming from the first PLMN service area 110 to the second PLMN service area 120 is performed. When the mobile terminal 100 moves into the border area 114 in which the first PLMN service area 110 and second PLMN service area 120 overlap, and the user applies an input to a specified item located at a predetermined position of an idle screen of the mobile terminal 100 for a preset period of time, as shown in FIG. 1, the PLMN of the first PLMN service area 110, in which the mobile terminal 100 is currently located, is compared with a Home PLMN of the mobile terminal 100. The Home PLMN is searched for when the two PLMNs are not identical to each other.

The specified item may have an indication representing "PLMN." When the user applies a tapping input or a long touch input continued for a preset period of time to the specified item marked with "PLMN", which are expressed in the idle screen of the mobile terminal 100, as shown in FIG. 1, the PLMN of a currently located service area is compared with a corresponding Home PLMN to determine whether the two PLMN are identical to each other, and then the Home PLMN is searched for depending on a result of the comparison. The user may apply the input via a finger, a touch pen, or the like.

The PLMN represents an identification number of a mobile communication network, that is, a mobile communication provider, and refers to a preferred network capable of providing a roaming service among PLMNs of providers who have contracted a roaming agreement with the provider of the Home network provider of the user of the mobile terminal 100. The Home PLMN refers to a communication provider's network to which the mobile terminal 100 has joined, or a network having contracted a roaming service agreement with the communication provider's network to which the mobile terminal 100 has joined.

When the mobile terminal 100 moves into the border area 114, or when the mobile terminal 100 is powered on, a last registered PLMN and a Home PLMN are searched for. In this case, when the mobile terminal 100 uses a communication provider's network called "A" in the first PLMN service area 110, and arrives at the second PLMN service area 120 via the border area 114, the last registered PLMN of the mobile terminal 100 corresponds to the first PLMN service area 110.

In addition, the last registered PLMN is a network having the highest priority in a preferred roaming network list when the mobile terminal 100 is driven or when the mobile terminal 100 moves from the first PLMN service area 110 to the second PLMN service area 120 via the border area 114, as shown in FIG. 1. The preferred roaming network list may be stored in the SIM or USIM of the mobile terminal 100. The preferred network list is a list of preferred networks recorded in the SIM or USIM by a network operation of a Home PLMN, to which the user of the mobile terminal 100 has joined. The network selected to have a highest priority may be a network having a carrier with a highest priority. A Home PLMN search method of the mobile terminal according to an exemplary embodiment of the present invention is described below with respect to FIG. 2.

Figure 2:
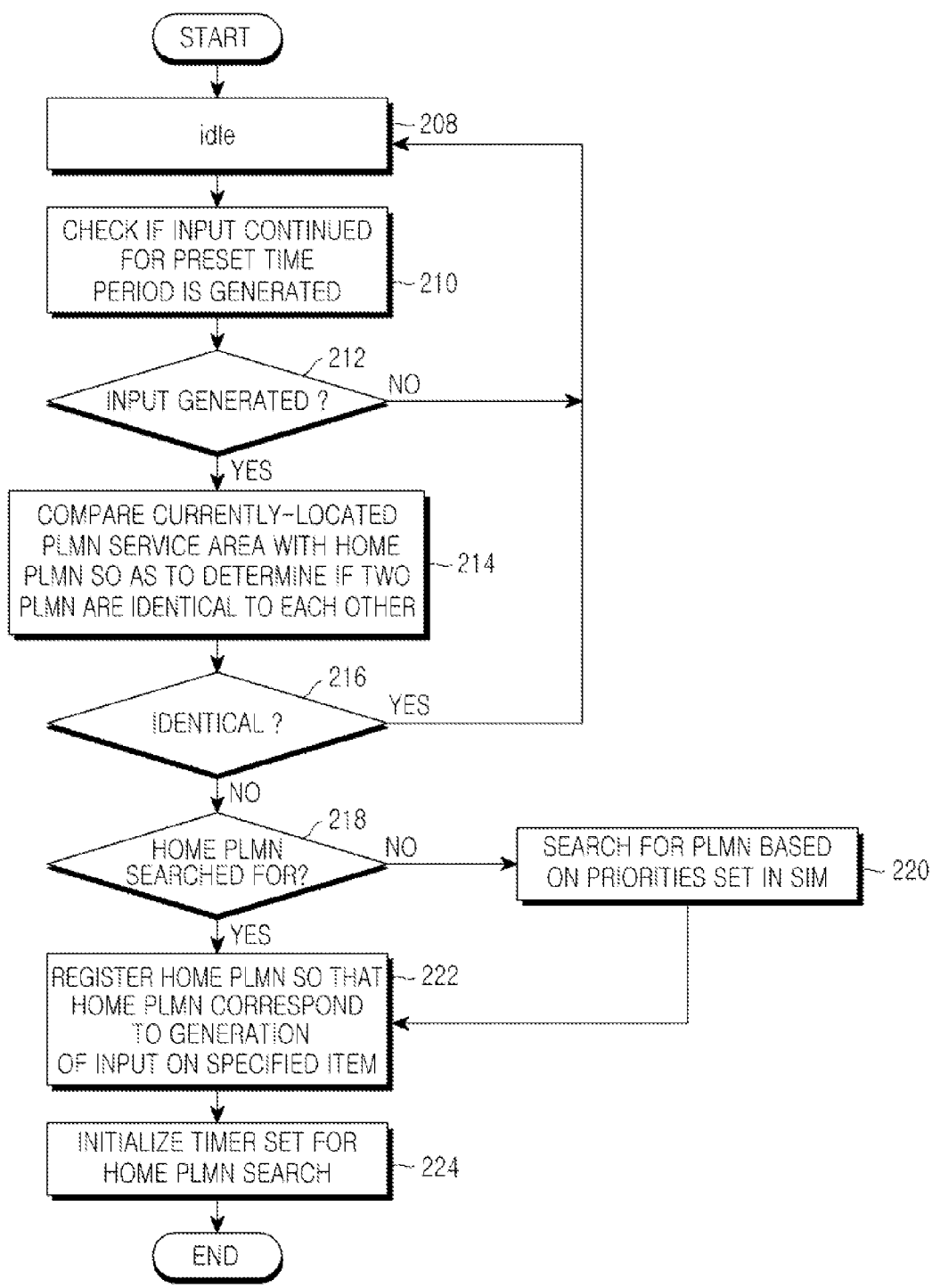
FIG. 2 is a flowchart illustrating the entire flow of the Home PLMN search method of the mobile terminal according to an exemplary embodiment of the present invention.

FIG. 2 is a flowchart illustrating the entire flow of the Home PLMN search method of the mobile terminal according to an exemplary embodiment of the present invention.

Referring to FIG. 2, a plurality of items are displayed in an idle screen of the mobile terminal in step 208. In step 210, it is determined whether an input continued for a preset period of time by the user is applied to a specified item, which is located in a predetermined region of the idle screen. The specified item represents an item marked with "PLMN," and it is determined whether, for example, a tapping input or a long touch input continued for a preset period of time using a user's finger, a touch pen, or the like is applied to the specified item marked with "PLMN" expressed in the idle screen of the mobile terminal.

When it is determined in step 212 that a user input is applied to the PLMN item, a PLMN service area in which the mobile terminal is currently located is compared with a Home PLMN service area to which the user of the mobile terminal has joined, in step 214 in order to determine if the two PLMN service areas are identical to each other.

When it is determined in step 216 that the PLMN service area is not identical to the Home PLMN service area as a result of the comparison, the procedure proceeds to step 218, where a corresponding Home PLMN of the mobile terminal is searched for. The network of a predetermined PLMN service area, which includes a base station and a base station controller and functions to ensure the mobility of the mobile terminal, determines whether the predetermined PLMN service area corresponds to the corresponding Home PLMN of mobile terminal, and searches for the Home PLMN in order to provide an international roaming service when the predetermined PLMN service area does not correspond to the corresponding Home PLMN. In this case, the Home PLMN represents a communication provider's network to which the mobile terminal 100 has joined, or a network having contracted a roaming service agreement with the communication provider's network to which the mobile terminal 100 has joined.

When a corresponding Home PLMN is found as a result of the search in step 218, the procedure proceeds to step 222, where the searched Home PLMN is registered so as to correspond to the specified item, i.e. the PLMN item, located within the idle screen of the mobile terminal. Thereafter, in step 224, a timer set for the Home PLMN search is initialized.

When a user input is not applied to the PLMN item as a result of the determination in step 210, the procedure returns to step 208, where it is determined whether a user input is applied to the idle screen. When the PLMN service area is identical to the Home PLMN as a result of the comparison in step 214, the procedure returns to step 208 so that the aforementioned procedure is again performed.

When searching for a corresponding Home PLMN of the mobile terminal fails in step 218, the procedure proceeds to step 220, where a PLMN is searched for based on priorities set in the SIM or USIM. The priorities set in the SIM or USIM are identified by a preferred roaming network list recorded in the SIM or USIM by a network operation of a Home PLMN to which the user of the mobile terminal has joined. Generally, when a mobile terminal moves into a border area in which a plurality of communication networks overlap, or when the mobile terminal is powered on, the mobile terminal searches for a last registered PLMN and a Home PLMN. In this case, when the mobile terminal uses a communication provider's network called "A" in a first PLMN service area, and arrives at a second PLMN service area via a border area, the last registered PLMN of the mobile terminal corresponds to the first PLMN service area.

The last registered PLMN may be a network having a highest priority in a preferred roaming network list set in the SIM or USIM of the mobile terminal. This is because the preferred roaming network list according to an exemplary embodiment of the present invention may correspond to a list of preferred networks recorded in the SIM or USIM by a network operation of a Home PLMN, to which the user of the mobile terminal has joined, and a network selected to have a highest priority is a network having a carrier with a highest priority.

The operation of searching for the Home PLMN of the mobile terminal according to an embodiment of the present invention may be implemented as described above. According to exemplary embodiments of the present invention, a PLMN search item is displayed in the idle screen of a mobile terminal having a touch screen, and a searched Home PLMN or preferred roaming network is registered and connected to the PLMN search item, so that the user can easily and rapidly perform a location registration in a Home PLMN or preferred roaming network only by one touch on the PLMN search item displayed in the idle screen, although the amount of communication increases due to frequent movement through border areas. Accordingly, a roaming service can be provided easily.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of searching for a Home Public Land Mobile Network (Home PLMN) of a mobile terminal, the method comprising:
    determining whether an input by a user is generated on a specified item displayed in a predetermined area of an idle screen of the mobile terminal, the specified item being related to PLMNs;
    comparing a PLMN in which the mobile terminal is operating with a Home PLMN of the mobile terminal when the input is generated as a result of the determination, and searching for the Home PLMN when the PLMN in which the mobile terminal is operating is not identical to the Home PLMN; and
    registering the searched Home PLMN so as to correspond with the specified item, and initializing a timer set for a subsequent Home PLMN search; and
    when the Home PLMN is not found, identifying a PLMN based on a priority list stored in a Subscriber Identity Card (SIM) or Universal SIM (USIM) in the user's mobile terminal, and modifying the user interface based on the identified PLMN,
    wherein the Home PLMN represents a network having contracted a roaming service agreement with the communication provider's network to which the mobile terminal has joined.

2. The method as claimed in claim 1, further comprising:
    searching for a PLMN based on priorities set in a corresponding Subscriber Identity Module (SIM) when the searching for the Home PLMN fails, and performing a location registration in the searched PLMN.

3. The method as claimed in claim 1, wherein the specified item indicates a corresponding PLMN of the mobile terminal.

4. The method as claimed in claim 2, wherein the priorities set in the SIM represent an order of preferred roaming networks recorded in the SIM by a network operation of a Home PLMN to which the mobile terminal has joined.

5. The method as claimed in claim 1, wherein the determining of whether the input is generated is performed according to a tapping operation of the user using a touch screen of the mobile terminal.

6. The method as claimed in claim 1, wherein the Home PLMN corresponds to either a communication provider's network to which the user of the mobile terminal has joined, or a network contracting a roaming service agreement with a provider of the communication provider's network, to which the user of the mobile terminal has joined.

7. A method of searching for a Home Public Land Mobile Network (PLMN), the method comprising:
- when receiving a predetermined input signal from a user, determining whether a current PLMN in which the user's mobile terminal is operating is identical to a Home PLMN of the user's mobile terminal;
- when the current PLMN is not identical to the Home PLMN, searching for the Home PLMN;
- when the Home PLMN is found, registering the found Home PLMN and modifying a user interface displayed on the user's mobile terminal such that a user interface item corresponding to the predetermined input signal is associated with the Home PLMN; and
- when the Home PLMN is not found, identifying a PLMN based on a priority list stored in a Subscriber Identity Card (SIM) or Universal SIM (USIM) in the user's mobile terminal, and modifying the user interface based on the identified PLMN,
- wherein the user interface item is displayed on an idle screen of the mobile terminal, and the Home PLMN represents a network having contracted a roaming service agreement with the communication provider's network to which the mobile terminal has joined.

8. The method of claim 7, wherein the predetermined input signal is generated when a user touches an icon displayed in the user interface for a predetermined period of time via a finger or stylus.

9. The method of claim 7, further comprising:
- initializing a timer set for a subsequent Home PLMN search.

* * * * *